(12) United States Patent
Lenertz et al.

(10) Patent No.: US 6,220,035 B1
(45) Date of Patent: Apr. 24, 2001

(54) ANNULAR COMBUSTOR TANGENTIAL INJECTION FLAME STABILIZER

(75) Inventors: James E. Lenertz, Scottsdale; Philip Samuel, Chandler, both of AZ (US)

(73) Assignee: AlliedSignal Inc., Morris Township, NJ (US)

( * ) Notice: Subject to any disclaimer, the term of this patent is extended or adjusted under 35 U.S.C. 154(b) by 0 days.

(21) Appl. No.: 09/153,427

(22) Filed: Sep. 14, 1998

Related U.S. Application Data

(60) Provisional application No. 60/058,926, filed on Sep. 15, 1997.

(51) Int. Cl.⁷ .............................. F02C 7/22; F23R 3/18; F23R 3/26; F23R 3/52
(52) U.S. Cl. .................... 60/737; 60/39.23; 137/625.47
(58) Field of Search .................... 60/737, 39.36, 60/39.23; 137/625.47

(56) References Cited

U.S. PATENT DOCUMENTS

| | | | |
|---|---|---|---|
| 2,384,783 | * 9/1945 | Longenecker | 137/625.47 |
| 4,255,927 | * 3/1981 | Johnson et al. | 60/39.23 |
| 5,230,314 | * 7/1993 | Kawahara et al. | 123/317 |
| 5,351,474 | * 10/1994 | Slocum et al. | 60/39.23 |
| 5,572,862 | * 11/1996 | Mowill | 60/39.23 |
| 5,638,674 | * 6/1997 | Mowill | 60/39.23 |
| 5,826,423 | * 10/1998 | Lockyer et al. | 60/39.463 |
| 5,924,276 | * 7/1999 | Mowill | 60/39.23 |

\* cited by examiner

*Primary Examiner*—Ted Kim
(74) *Attorney, Agent, or Firm*—Robert Desmond, Esq.

(57) ABSTRACT

A lean-premix-prevaporization combustion system has a combustion chamber and a premixed injector that injects a hot gas, formed from the ignition of a lean mixture of air and fuel, into the combustion chamber. A pilot injector is mounted to the wall of the combustion chamber and injects fuel into the combustion chamber. Upon entering the combustion chamber this fuel ignites to form a fuel rich zone which stabilizes the flame in the combustor.

4 Claims, 8 Drawing Sheets

ANNULAR COMBUSTOR TANGENTIAL INJECTION FLAME STABILIZER

REFERENCE TO COPENDING APPLICATION

This application claims the benefit of U.S. Provisional Application No. 60/058,926 filed Sep. 15, 1997.

TECHNICAL FIELD

This invention relates generally to a combustion system for a gas turbine engine or other heat devices. More particularly, the present invention relates to a system and method for stabilizing the flame in a low $NO_x$ producing combustor.

BACKGROUND OF THE INVENTION

Gas turbine engines of the type used for industrial applications may employ combustor systems designed to minimize nitrogen oxide emissions. One class of such combustor systems are referred to as lean-premix-prevaporization (LPP) combustors. LPP systems operate by reducing excess air into the combustion zone to control nitrogen oxide levels. This lowers the overall flame temperature, because part of the energy released will be utilized to raise the excess air temperature to reaction temperature. The air and fuel are premixed prior to entering the combustion zone to allow uniform flame temperature. One example of an LPP systems is disclosed in U.S. Pat. No. 5,481,866, entitled Single Stage Premixed Constant Fuel/Air Ratio Combustor, issued to Mowill on Jan. 9, 1996, which is hereby incorporated by reference. Another example of an LPP systems is disclosed in U.S. Pat. No. 6,070,406, entitled "Combustor Dilution Bypass System" and which is assigned to the assignee of this application.

Because LPP systems operate with very lean fuel-to-air ratios, they are always on the edge of blowing out. That is losing the flame in the combustor. As a result, it is not uncommon for these combustors to have bundles of unburnt gas circulating within the combustion chamber. When these bundles finally ignite, they burn fast and create a pressure pulse or wave. These pressure waves may be canceled or reinforced by the reflection of these waves off the combustion chamber liner. If reinforced, a pressure oscillation is created which can damage hardware, cause unacceptable vibration levels, and which may even be audible.

Accordingly, a need exists for stabilizing the flame and thereby eliminate these pressure oscillations in LPP combustor systems.

SUMMARY OF THE INVENTION

In view of the above, it is an object for this invention to provide a LPP combustor system designed for low nitrous oxide emissions having a flame stabilizer that reduces or eliminates pressure oscillations caused by bundles of unburnt gas.

The present invention achieves these objects by providing a lean-premix-prevaporization combustion system that has a combustion chamber and a premixed injector that injects a hot gas, formed from the ignition of a lean mixture of air and fuel, into the combustion chamber. A pilot injector is mounted to the wall of the combustion chamber and injects fuel into the combustion chamber. Upon entering the combustion chamber this fuel ignites to form a fuel rich zone which stabilizes the flame in the combustor.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

The following description is made with reference to one particular lean-premix-prevaporization (LPP) combustor system. The present invention, however, is applicable to any LPP systems.

Referring to FIGS. 1 through 5, a bypass system is indicated generally by the numeral 10. The bypass system 10 includes a three way valve 12 connected to a combustor bypass 13. In the preferred embodiment, two bypass systems 10 are used, one on each side of the combustor and spaced 180 degrees apart. A different number or arrangement of bypass systems than what is shown here may be preferable depending on the particular engine and application.

Figure 5:
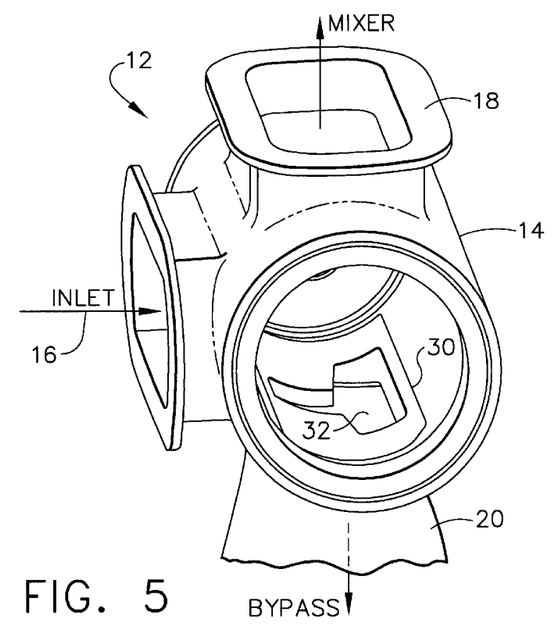
FIG. 5 depicts a perspective view of the three way valve contemplated by the present invention.

The three way valve 12 comprises a cylindrical housing 14 defining an inlet port 16, and two exit ports 18 and 20. Inlet port 16 is connected to an inlet duct 17 for receiving compressed air from the combustor plenum 19. Exit port 18 connects to the premixer duct 22 leading to the premixer and the combustor, and exit port 20 connects to the bypass duct 24. The valve 12 includes a crescent shaped rotatable valve plate 26 for selectively controlling the relative proportions of airflow to premixer duct 22 and bypass duct 24.

Figure 1:
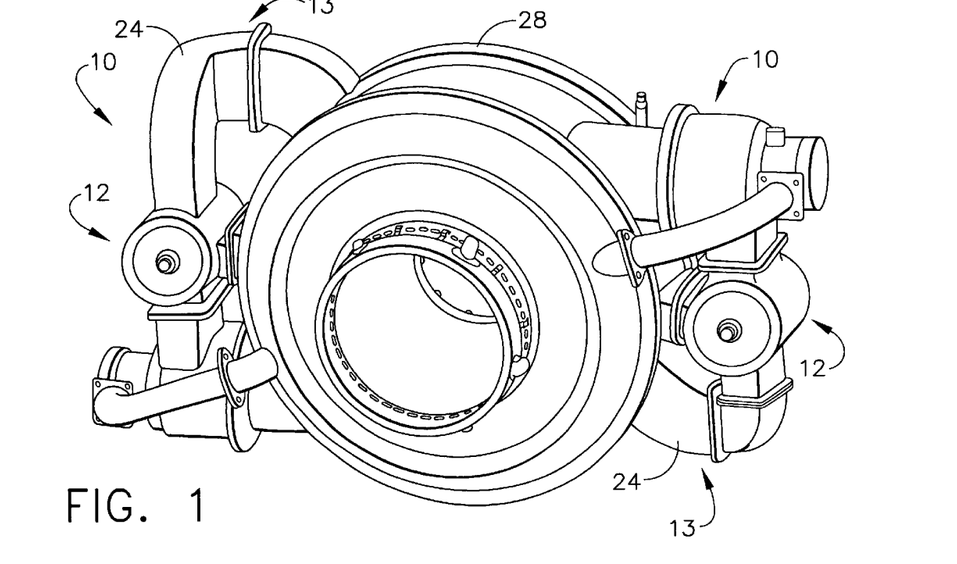
FIG. 1 depicts a perspective view of a low emissions combustor with a dilution bypass system of the type contemplated by the present invention.
Figure 2:
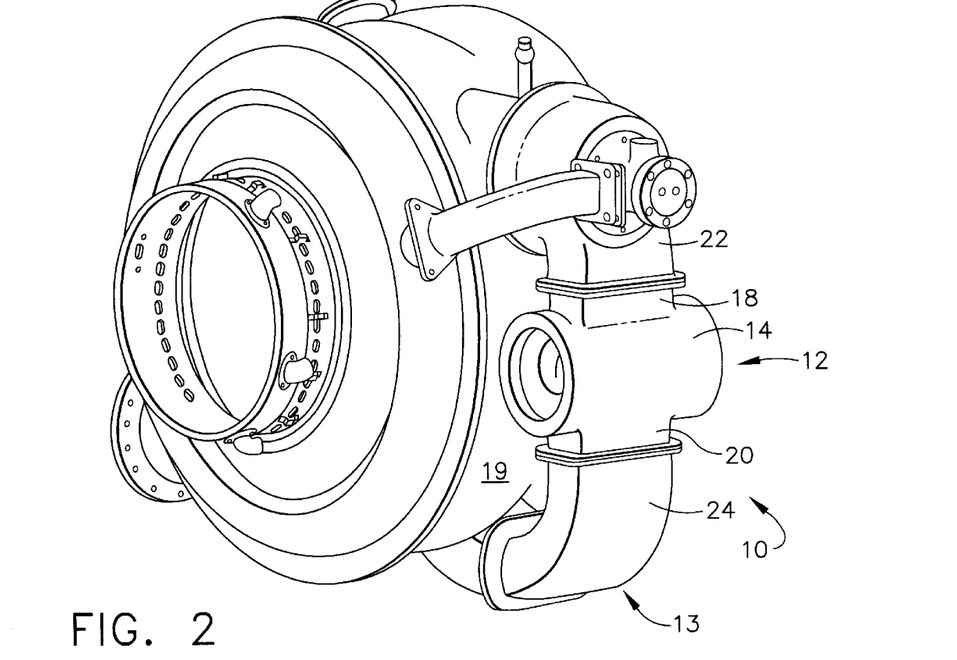
FIG. 2 depicts the combustor of FIG. 1 from a different perspective.
Figure 3:
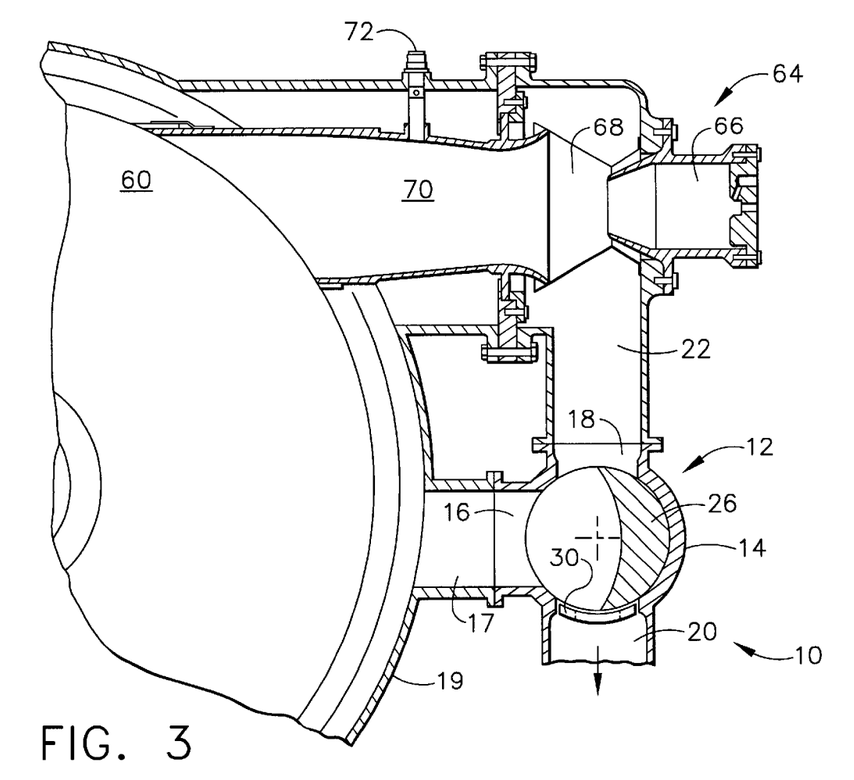
FIG. 3 depicts a sectional view through the combustor and dilution bypass system of FIG. 2.
Figure 4:
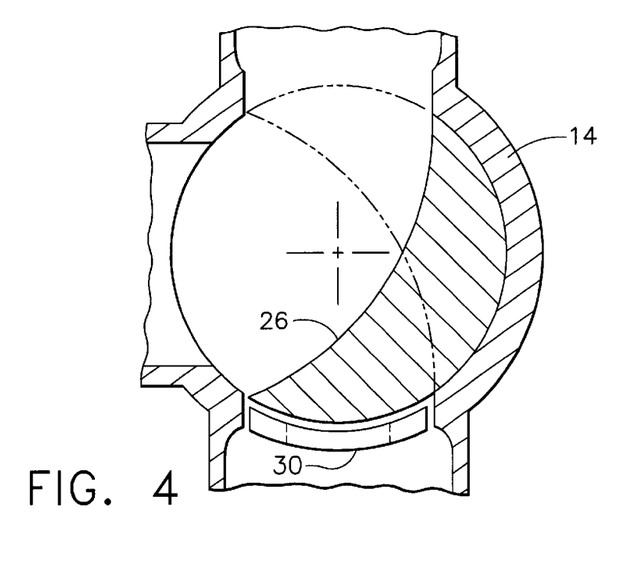
FIG. 4 depicts an enlarged fragmentary sectional view of a portion of FIG. 3.

This flow distributing or dividing function of the valve can be best visualized by referring to FIGS. 3 and 4. As shown in FIG. 3, when valve plate 26 is in the idle position, most of the airflow is directed to bypass duct 24, and very little is directed to the premixer 22. Conversely at maximum power condition, most of the airflow is directed to the premixer 22, and very little to the bypass duct 24. FIG. 4 depicts an intermediate power setting wherein the valve plate 26 is positioned to more evenly divide the flow between the premixer and bypass. As evident from the drawings, the crescent shape of the rotatable valve plate 26 provides for a smooth and efficient air flowpath from inlet port 16 to either of the exit ports 18 or 20, particularly at idle and maximum power conditions.

Figure 6:
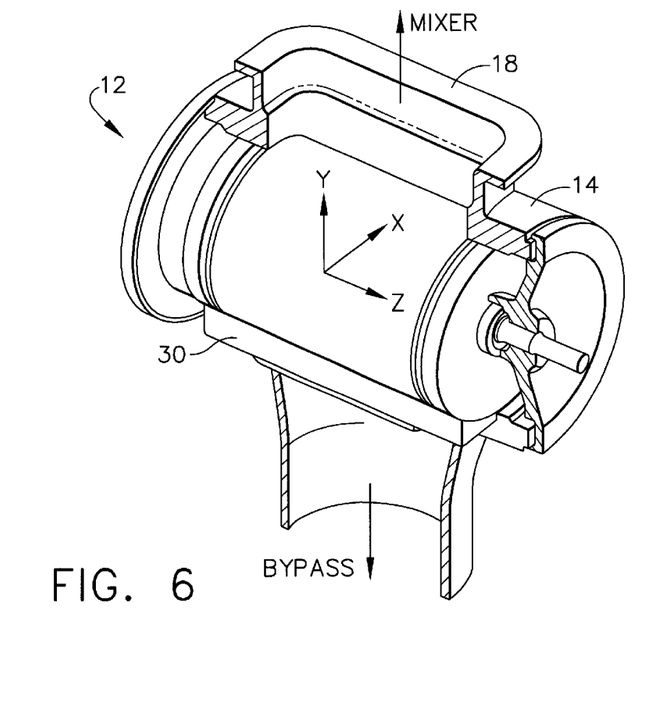
FIG. 6 depicts a partial cut-away perspective view of the three way valve contemplated by the present invention.
Figure 7:
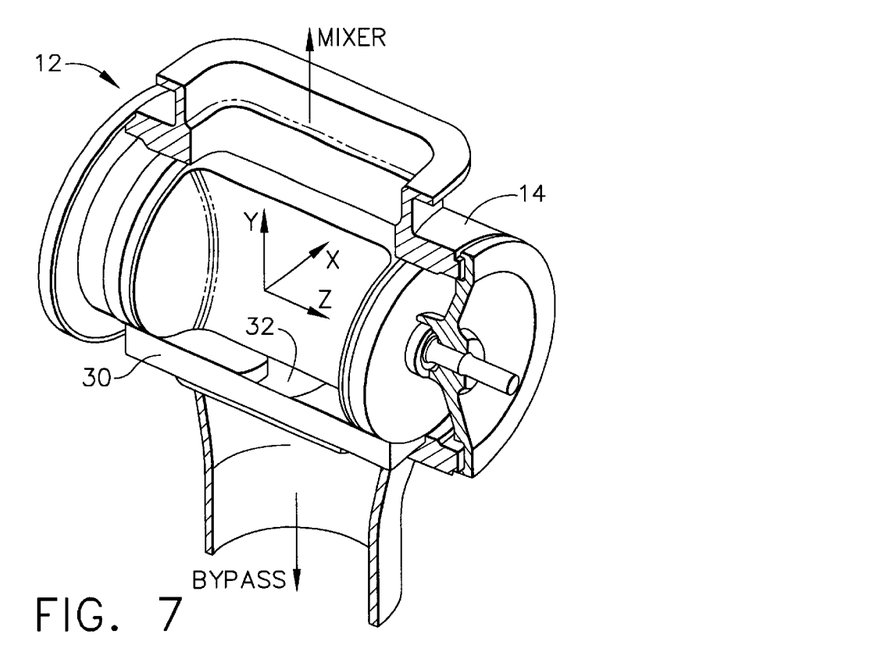
FIG. 7 depicts another partial cut-away perspective view of the three way valve contemplated by the present invention.
Figure 8:
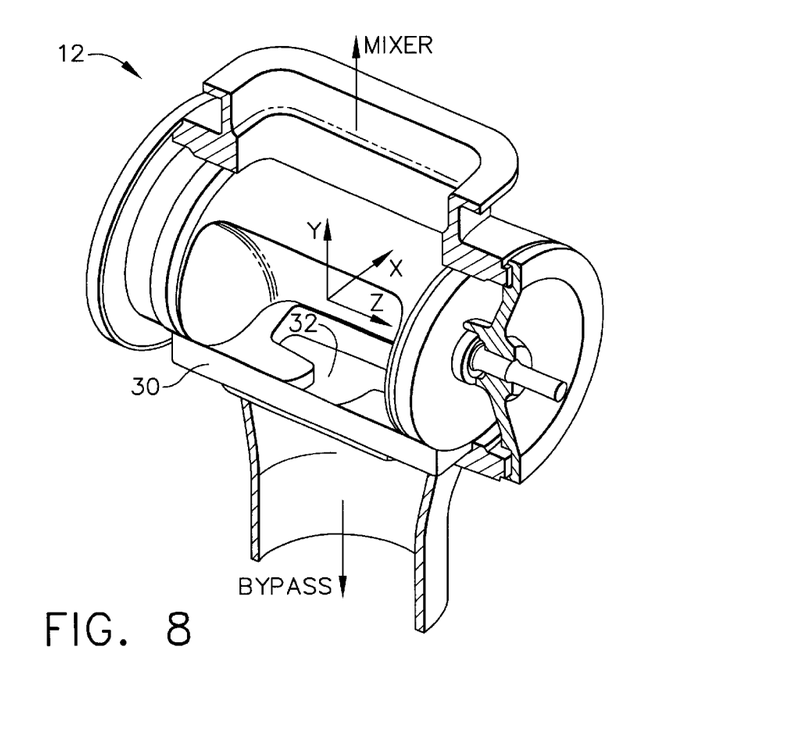
FIG. 8 depicts a third partial cut-away perspective view of the three way valve contemplated by the present invention.

Referring now to FIGS. 5–8, three way valve 12 further comprises an exchangeable bypass orifice plate 30 replaceably mounted in the exit port 20 which leads to the bypass. Maintaining a constant pressure drop across the combustor and providing the right amount of air to the premixer requires preferential scheduling of the ratio of air supplied to the premixer and to the bypass. The bypass orifice plate 30 includes a variable width orifice 32 for this purpose. By preferentially shaping the orifice 32, the ratio of the flow areas of the bypass port to the premixer port can be controlled, and thereby control the ratio of air supplied to each. FIGS. 6 through 8 show valve plate 26 exposing orifice plate 30 to varying degrees for three power settings: maximum power in FIG. 6; fifty percent power in FIG. 7; and shut down, or idle condition in FIG. 8. Orifice plates with differently shaped orifices 32 may be substituted as required for the particular engine or installation.

Figure 9:
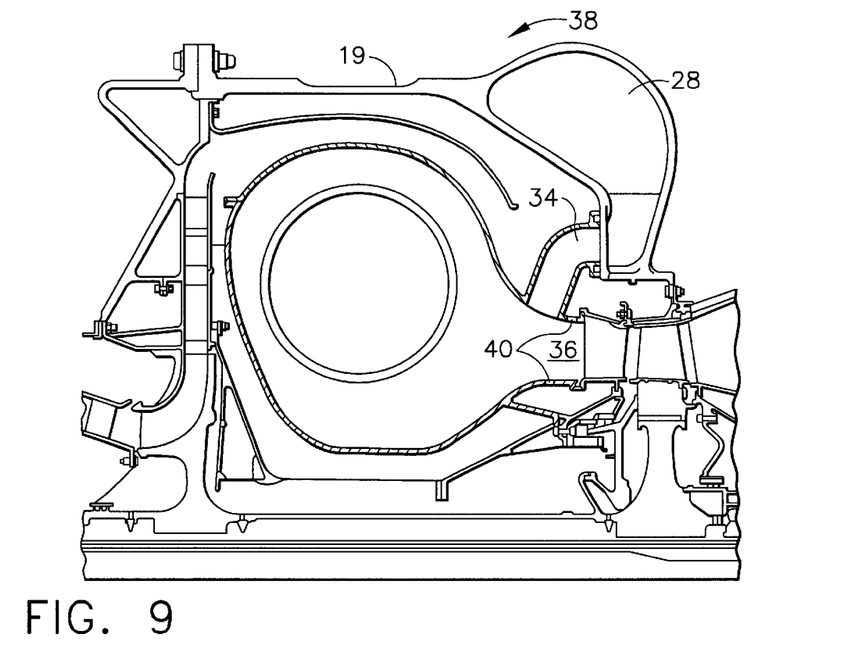
FIG. 9 depicts a transverse sectional view of the combustor of FIG. 1.
Figure 10:
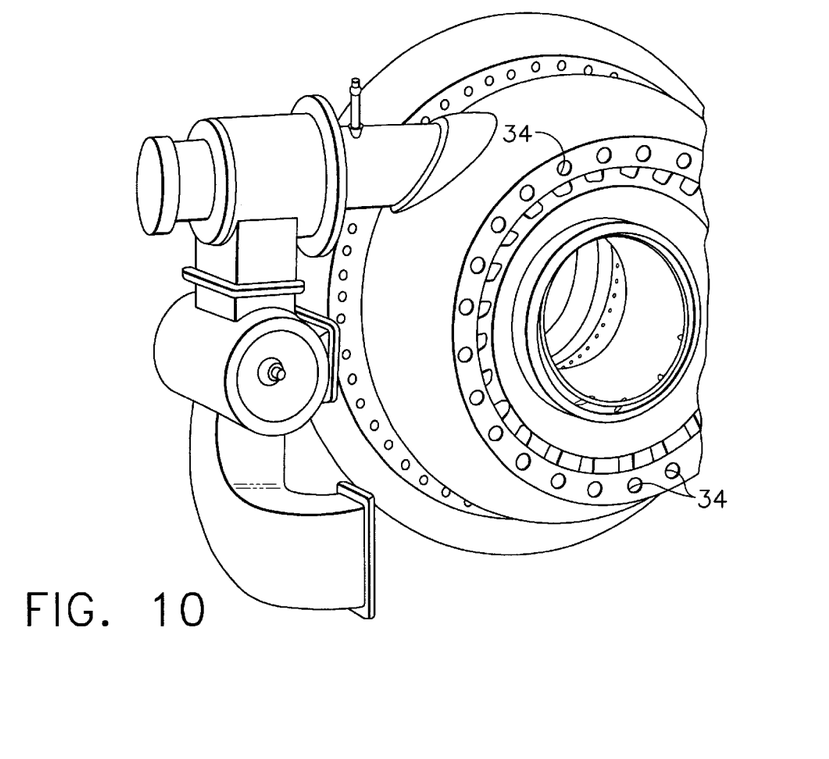
FIG. 10 depicts a perspective view of a portion of the combustor and dilution bypass system.

Bypass 13 further includes an annular bypass manifold 28, shown in FIG. 9, which receives air from bypass ducts 24. A plurality of tubes 34 shown in FIGS. 9 and 10 extend from and connect bypass manifold 28 to the dilution zone 36 of combustor 38. Together, the valve 12, bypass ducts 24, bypass manifold 28, and tubes 34 provide a clear flowpath with minimal pressure drop for routing compressed air directly from the compressor exit to the dilution zone 36.

Figure 11:
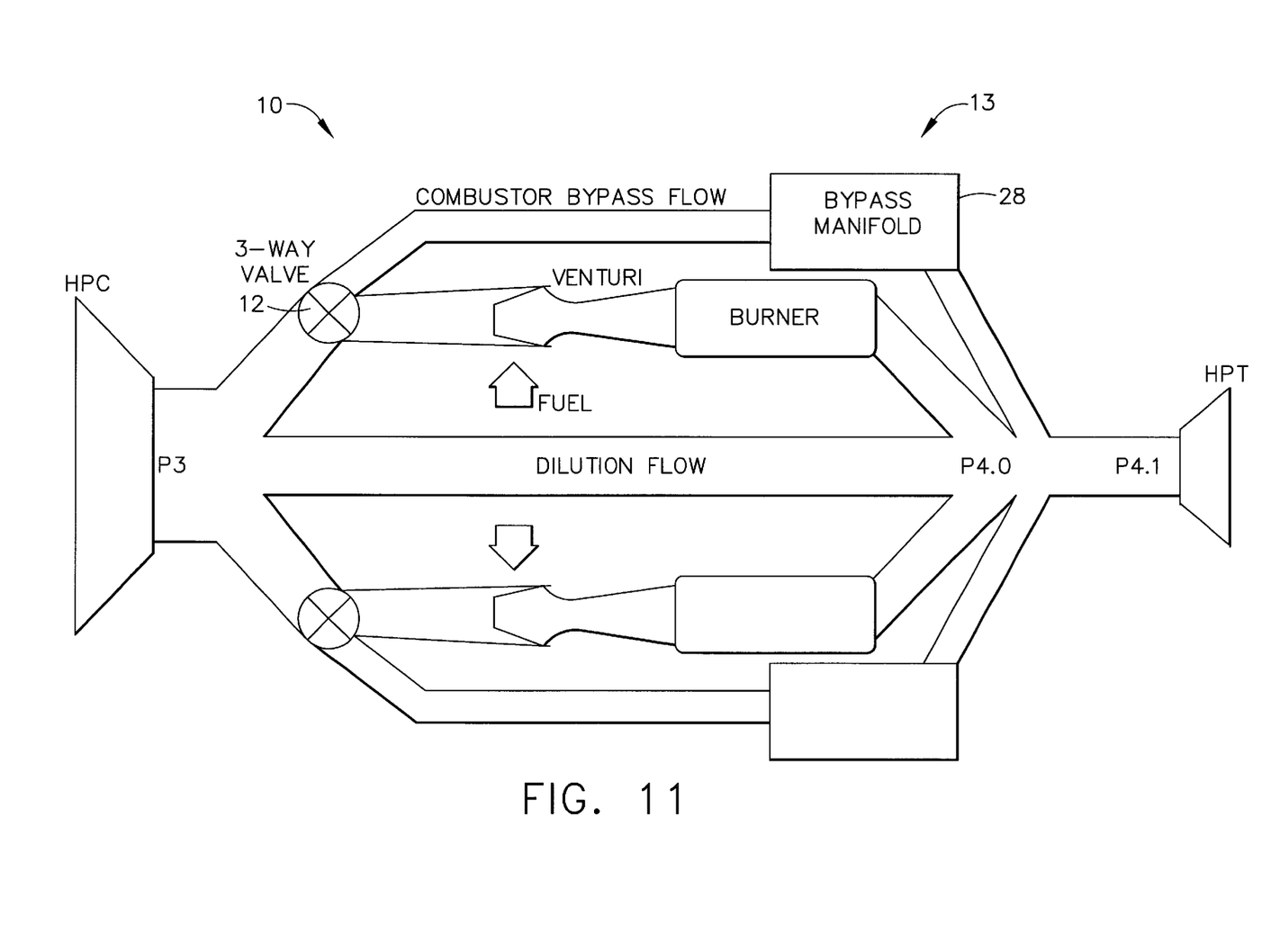
FIG. 11 depicts a schematic view of the combustor dilution bypass system.

In operation, the three way valve and bypass function to provide an alternate path for dilution air, shown schematically in FIG. 11. The extent to which this alternate path is utilized is dependent on the engine power setting. At maximum power condition, the path to the bypass 13 is closed off, forcing most of the air to the premixer 22 and through the combustor. Any excess air is then indirectly caused to re-enter the gas flowpath through the dilution ports 40 surrounding the dilution zone 36. Dilution ports 40 are sized for providing efficient flow at this maximum power setting, and so as to produce the desired pressure drop across the combustor. In this condition, the bypass is essentially not utilized.

As power is decreased from maximum, valve 12 is rotated toward the idle position, ultimately mostly closing off the port 18 leading to the premixer. Although engine power is substantially reduced at idle, the total airflow being pumped by the compressor is not. Thus at idle power, the volume of excess air, i.e. air not going to the premixer, increases dramatically. Were it not for the bypass, all of the excess air would be directed through the dilution ports 40 resulting in a larger than desired pressure drop across the combustor. However by simultaneously opening the alternate path through the bypass duct, the three way valve allows for the large flow of low power excess air to reach the dilution zone 36 without having to flow through the overly restrictive dilution ports. Rather, the flow is divided, with an appropriate amount flowing through dilution ports 40, and the majority of the excess air flowing through the bypass. Through use of the bypass orifice plate 30, the proper distribution of bypass air, to air through ports 40 can be achieved such that the combustor pressure drop is maintained constant for all operating conditions.

Figure 12:
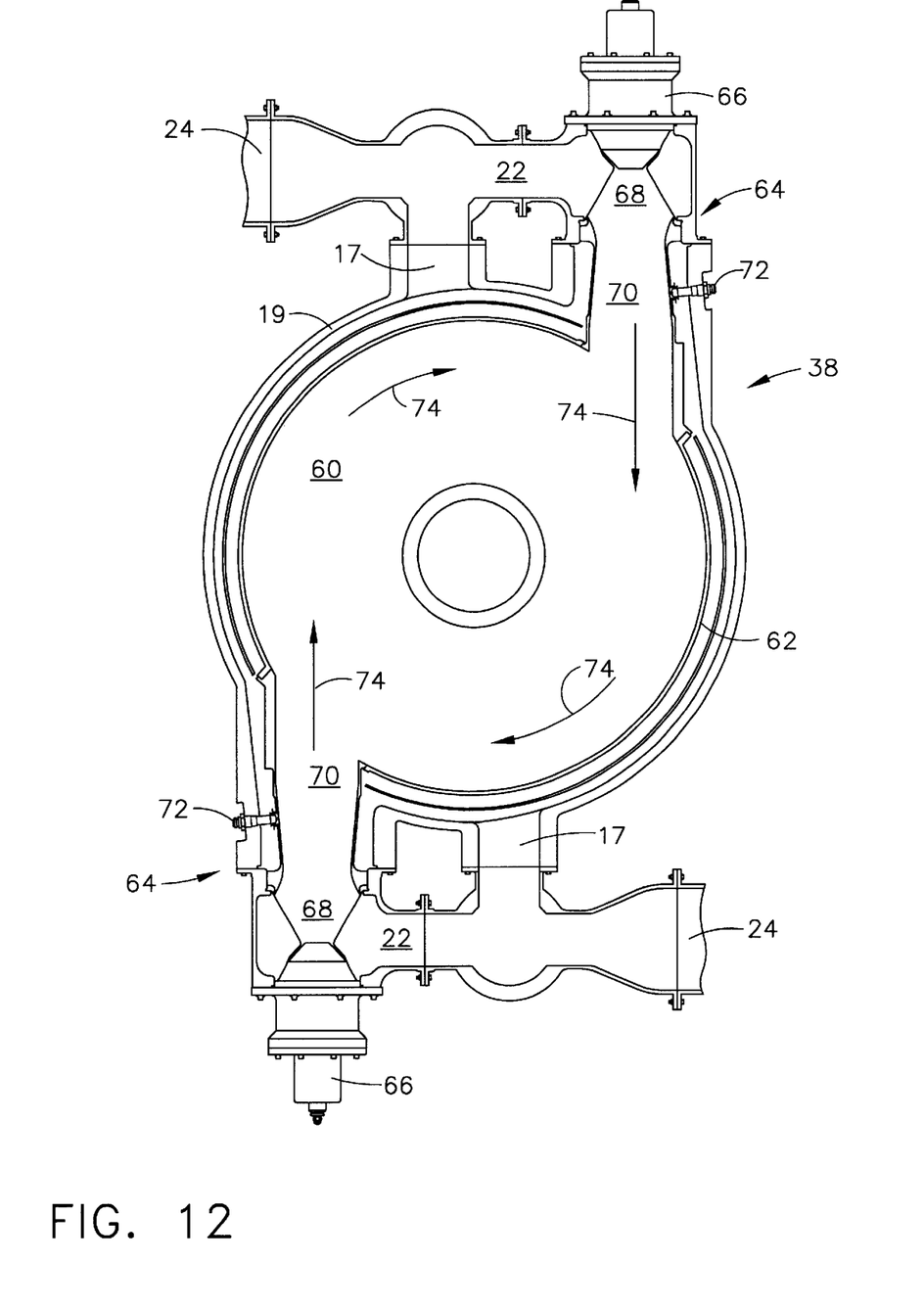
FIG. 12 is a cross sectional view of the combustor.

Referring to FIG. 12, the combustor 38 includes a combustion chamber 60 defined by a combustor liner wall 62 that circumscribed by the combustor plenum 19. Two premixed injectors 64 inject tangentially a mixture of fuel and air into the combustion chamber 60. Each of the injectors 64 has an air blast fuel nozzle 66, a venturi 68, a premix chamber 70 and an igniter 72. In operation, the air blast nozzle inject a fuel-air mixture into the venturi 68. In the venturi additional air is added through premixer duct 22. To keep the nitrous oxide as low as possible the fuel air mixture exiting the venturi and entering the premix chamber 70 is as fuel lean as possible. The igniter 72 ignites this lean mixture creating a hot gas that flows in a rotational direction indicated by arrows 74.

Figure 13:
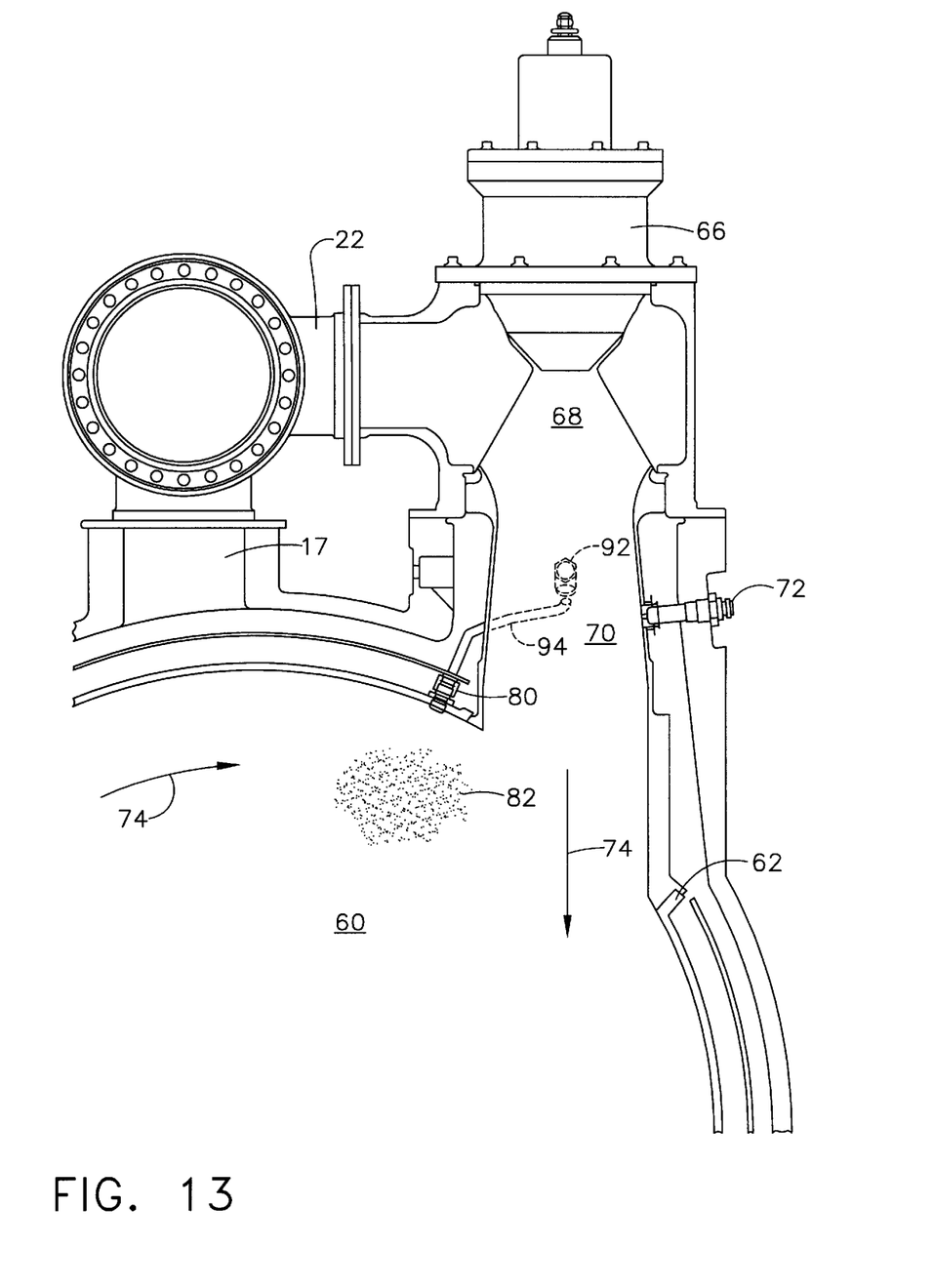
FIG. 13 is a portion of FIG. 12 with the flame stabilizing pilot.

Referring to FIG. 13, a flame pilot injector 80 is mounted in the combustor liner just upstream, with respect to the rotational flow of hot gas indicated by arrows 74, of the exit of each of the premixed injectors. The two injectors 80 inject fuel up to about 15% of the total fuel flow in the combustion chamber. Remembering that the fuel air mixture exiting the premixed injector is lean, the pilot injectors produce a hot flame or fuel rich zone 82 that envelops this lean mixture thus providing stabilizing influence on the combustion process of the lean mixture. The pilot injectors can be turned on or off as needed and flow rate through the pilot injectors can also be adjusted. To avoid two sources of fuel, the fuel injected by the pilot injectors should be the same as the fuel in the premixed injector. This fuel may be natural gas, diesel, or jet fuel. Piping 94 is used to deliver fuel to the injector 80. Specifically, piping 94 extends from an inlet 92, which is behind the premix chamber 70 looking at FIG. 13, around the premix chamber 70 and then to the injector 80.

Various modifications and alterations of the above described sealing apparatus will be apparent to those skilled in the art. Accordingly, the foregoing detailed description of the preferred embodiment of the invention should be considered exemplary in nature and not as limiting to the scope and spirit of the invention.

What is claimed is:

1. A gas turbine engine comprising:
   a compressor providing pressurized air;
   a turbine for expanding a hot gas;
   a combustor disposed between the compressor and the turbine; said combustor comprising;
   a combustion chamber defined by a combustor wall;
   a plenum circumscribing the combustor wall and receiving pressurized air from the compressor;
   at least one premixed injector for injecting a lean fuel and air mixture into the combustion chamber, the premixed injector having an igniter for igniting said fuel and air mixture to initiate the formation of a hot gas that flows from the premixed injector exit into the combustion chamber forming a rotational flow of said hot gas in said combustion chamber;
   at least one pilot injector disposed in said combustor wall upstream, with respect to said rotational flow, of the premixed injector's exit for injecting fuel into the combustion chamber, whereby upon entering the combustion chamber the fuel ignites to form a fuel rich zone in said rotational flow that envelops the lean mixture exiting said premixed injector and stabilizes the combustion process;
   a dilution zone just upstream of said turbine, the dilution zone receiving a portion of the air in said plenum through at least one dilution hole;
   a bypass system for controlling the flow of the remaining portion of said air in said plenum to the premixed injector and the dilution zone, said bypass system including a first conduit extending from the plenum; a second conduit in fluid communication with the first conduit and the premixed injector; a third conduit in fluid communication with the first conduit and the dilution zone; and a valve disposed between the first, second, and third conduits for directing the flow of air from the plenum to the premixed nozzle and the dilution zone, said valve comprising a housing having a first port connected to the first conduit, a second port connected to the second conduit and a third port connected to the third conduit, and a crescent shaped valve rotor rotatably mounted to the housing, said valve having an exchangeable orifice plate mounted in the third port.

2. The gas turbine engine of claim 1 wherein the premixed injector further includes an air blast fuel nozzle, a venturi, and a premix chamber.

3. The gas turbine engine of claim 1 wherein the pilot injector includes a fuel nozzle and piping for connecting the fuel nozzle to fuel source.

4. The gas turbine engine of claim 1 further comprising an annular bypass manifold in fluid communication with the third conduit and a plurality of tubes extending from the bypass manifold to the dilution zone.

\* \* \* \* \*